United States Patent [19]

Stewart

[11] 4,158,752

[45] Jun. 19, 1979

[54] CARRIER SUBSCRIBER TELEPHONE STATION TERMINAL LOOP CURRENT BOOSTER

[75] Inventor: James A. Stewart, Menlo Park, Calif.

[73] Assignee: GTE Automatic Electric Laboratories Incorporated, Northlake, Ill.

[21] Appl. No.: 862,802

[22] Filed: Dec. 21, 1977

[51] Int. Cl.² .............................................. H04B 3/00
[52] U.S. Cl. ................................ 179/2.5 R; 179/16 F
[58] Field of Search ........................ 179/2.5 R, 16 F; 323/DIG. 1

[56] References Cited

U.S. PATENT DOCUMENTS

| 3,527,894 | 9/1970 | Mesenhimer et al. | 179/16 F |
| 3,641,422 | 2/1972 | Farnsworth et al. | 323/DIG. 1 |
| 3,689,700 | 9/1972 | Lent | 179/16 F |
| 4,122,312 | 10/1978 | Glenn | 179/16 F |

Primary Examiner—Kathleen H. Claffy
Assistant Examiner—Kenneth A. Chayt
Attorney, Agent, or Firm—Russell A. Cannon

[57] ABSTRACT

The local battery and elements of a booster circuit of the energy storage-energy discharge type of swinging choke power converter are connected in series in the subscriber's local battery loop of a carrier subscriber station terminal. A smoothing capacitor is connected across the battery and booster circuit elements for providing a loop voltage there that may be greater than a local battery voltage where a subscriber Touch-Tone telephone set is off-hook and sending calling signals. Current in the circuit elements is monitored for controlling the duration of the portion of a cycle of operation of the converter during which energy is stored by the choke and, thus, maximum current drain from the battery. In an alternate embodiment, the smoothing capacitor is connected across only circuit elements.

26 Claims, 7 Drawing Figures

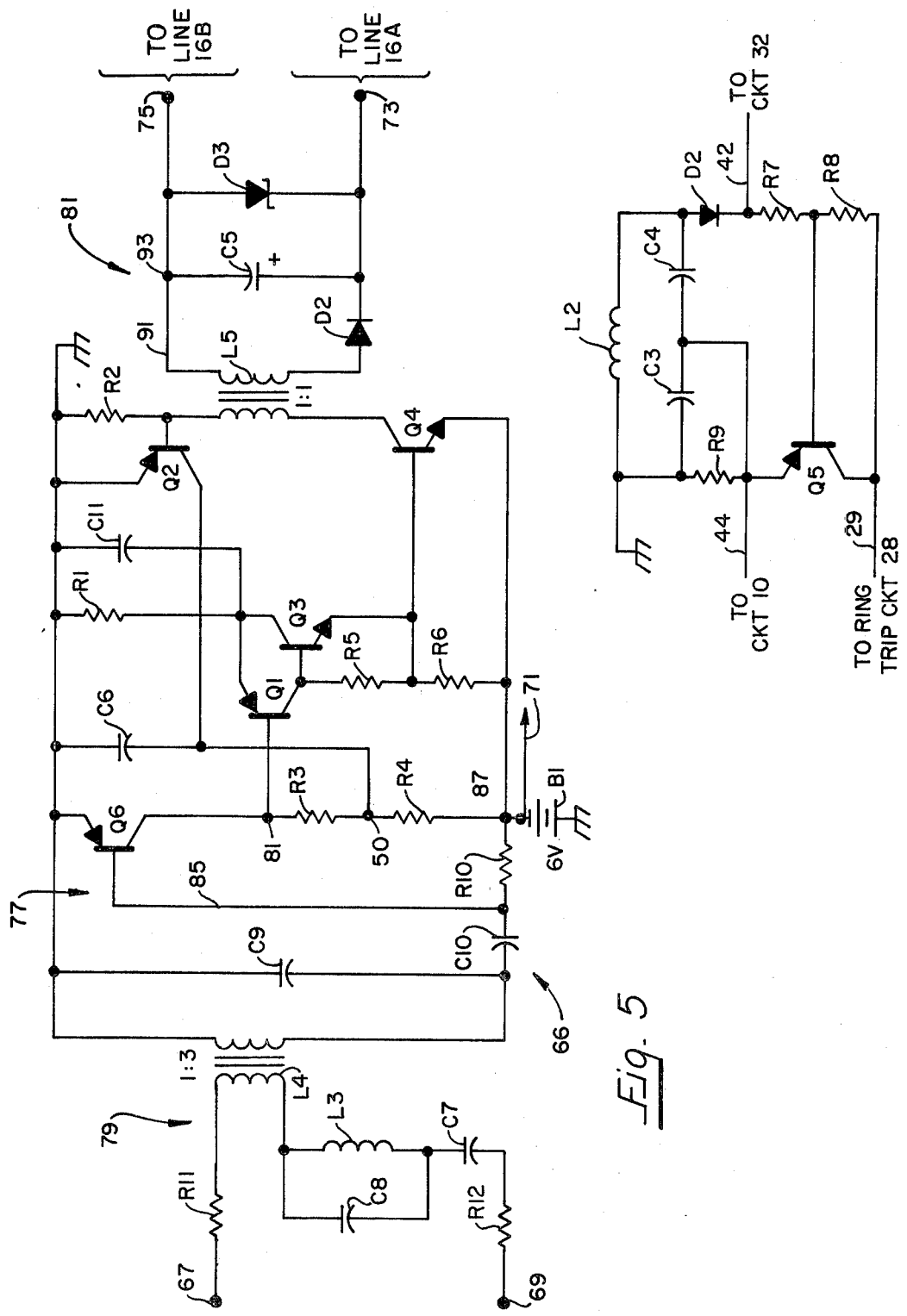

CARRIER SUBSCRIBER TELEPHONE STATION TERMINAL LOOP CURRENT BOOSTER

BACKGROUND OF INVENTION

This invention relates to carrier subscriber telephone station terminal equipment, and more particularly to electrical circuitry in a carrier subscriber station which may make the available current in the loop there be greater than that provided by only a local battery there.

Carrier subscriber telephone station terminal equipment is available which is designed to operate from a 6 volt local battery that is charged by line current from a central office battery. This means that the available local supply voltage in a station terminal for operating a handset and electrical circuits in the subscriber station terminal is less than 6 volts by an amount which depends on the level of charge on the local battery. This battery voltage provides adequate loop current for operating conventional rotary dial telephone sets. It has been found, however, that such a local battery voltage does not provide sufficient current in the station terminal loop for operating some Touch-Tone type telephone sets. More specifically, it does not provide adequate current for operating on high resistance loops such as are experienced with button-down operation of touch calling telephone sets equipped with polarity guard bridge rectifiers.

An object of this invention is the provision of a circuit which may cause the available supply voltage at a subscriber station to be greater than the local battery voltage there for increasing the current supplied in a station terminal loop supplied to the subscriber telephone set.

SUMMARY OF INVENTION

In accordance with this invention, apparatus for providing a voltage in a subscriber station terminal loop that may be greater than a local battery voltage in the subscriber station terminal when a subscriber handset there is off-hook, comprises: first means, which is an inductive means for storing electrical energy, being electrically connected in series with the battery; second means, which is a switch means, electrically connected across the series combination of said inductive means and the battery; third means, which is a means for storing electrical energy, electrically coupled to the subscriber loop; fourth means responsive to an off-hook condition of the handset for connecting a signal voltage to said second means for closing said second means for passing a battery current through said first means for inducng a field on the first means which stores energy; fifth means which is a control means responsive to the current through said first means for opening said second means when this current exceeds a prescribed value; and sixth means decoupling said first means from said third means when said second means is closed for storing energy in said first means, and coupling said first means to said third means when said second means is open for enabling energy stored in said first means to be transferred to said third means for producing a voltage thereon which drives the subscriber station terminal loop.

DESCRIPTION OF DRAWINGS

This invention will be more fully understood from the following detailed description of preferred embodiments thereof, together with the drawings in which:

FIG. 2 is a circuit diagram of the transmit oscillator 30 in FIG. 1;

FIG. 5 is a circuit diagram illustrating an alternate embodiment of this invention;

DESCRIPTION OF PREFERRED EMBODIMENTS

Figure 1:
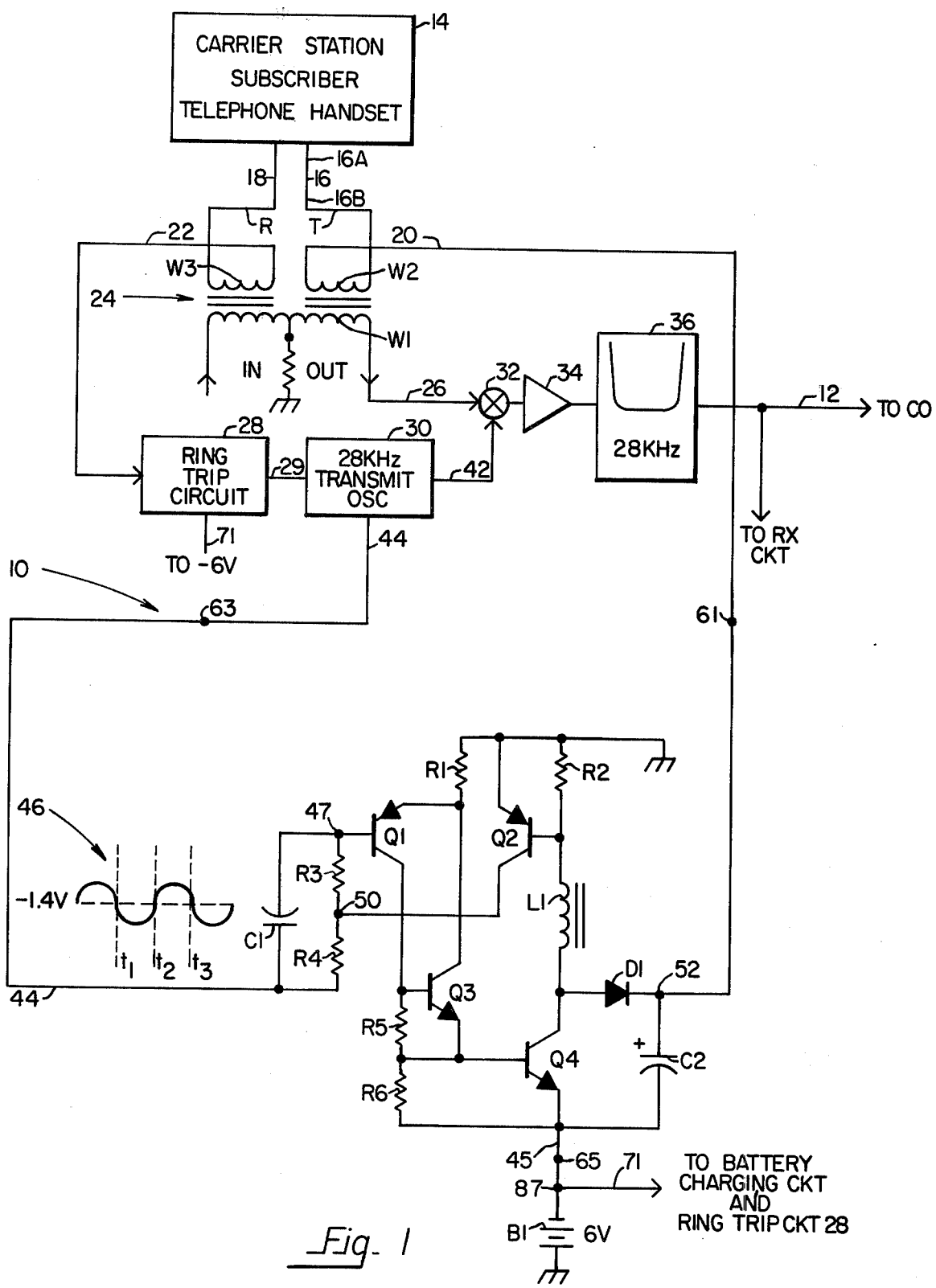
FIG. 1 is a schematic circuit and block diagram of a portion of a carrier subscriber telephone station terminal embodying this invention.
Figure 6:
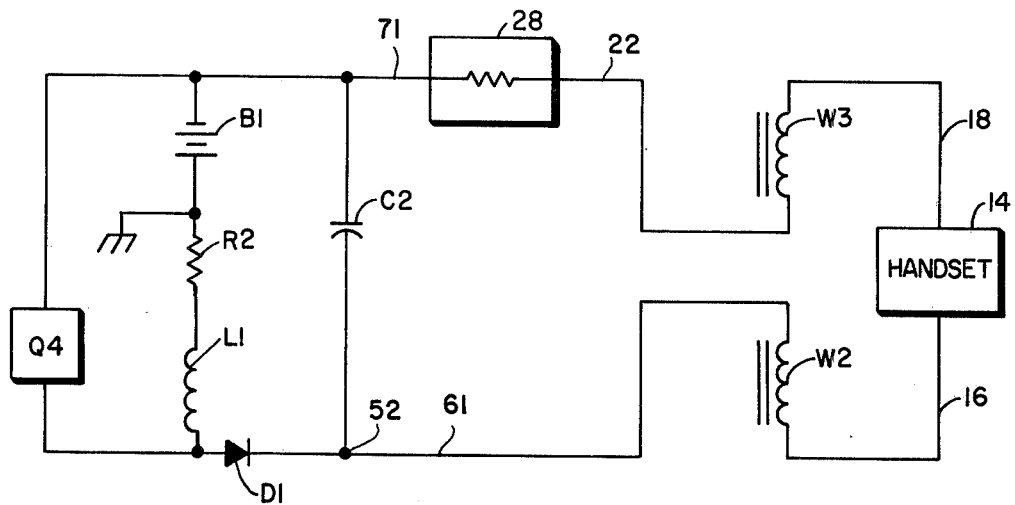
FIG. 6 is a circuit representation of the carrier subscriber station terminal local battery loop in the circuit of FIG. 1.

The booster circuit 10 in FIG. 1 is designed to operate in a carrier subscriber telephone station terminal which is powered by a 6 volt local battery B1 that is charged with line current on a cable pair 12 from a central office battery, although this is not an essential requirement of this invention. The subscriber station is conventional and is only generally illustrated in FIG. 1. The station is shown as comprising the local battery B1; a touch-tone subscriber telephone handset 14, for example, including hook switch, etc.; a voice frequency (VF) hybrid 24; a ring-trip circuit 28; a transmit oscillator 30; a modulator 32; and a transmit filter 36. The center tapped primary winding W1 of the VF hybrid 24 couples output and input signals to and from the cable pair 12. One side of each of the secondary windings W2 and W3 is connected via tip-and-ring lines 16 and 18, respectively, to the handset 14. The other side of W2 is connected to line 20 and through elements D1, L1, and R2 of circuit 10 to ground (which is the positive side of B1). The other side of W3 is connected through line 22 and a ring-trip circuit 28 to the negative side of the battery. The ring-trip circuit 28 may be similar to that illustrated in U.S. Pat. No. 3,927,266, issued Dec. 16, 1975, to James A. Stewart and Neale A. Zellmer. When handset 14 is off-hook, the ring-trip circuit connects a voltage to line 29 that energizes transmit oscillator 30. The path from the ground reference potential through elements R2, L1 and D1, winding W2, line 16, handset 14, line 18, winding W3, ring-trip circuit 28, and line 71 battery B1 back to ground is referred to as the local subscriber loop (see FIG. 6). The impedance of the local loop may vary depending on the type of telephone set 14 that is connected across the tip-and-ring lines 16 and 18.

The transmit oscillator 30 is shown in more detail in FIG. 2. It is essentially a 28 kHz Colpitts oscillator comprising a grounded collector transistor Q5. The operating frequency of oscillator 30 is determined by inductor L2 and capacitors C3 and C4. These capacitors also set the voltage gain of the oscillator. The booster circuit 10 is connected on line 44 to the oscillator transistor Q5 emitter, whereas modulator 32 is connected on line 42 to coil L2 with a diode offset. The diode D2 and resistors R7 and R8 set the DC bias level on line 44 and on the Q5 base at approximately −1.4 volts and −2.0 volts, respectively, for turning Q5 on when line 29 is connected to the negative battery voltage through the ring-trip circuit 28. Thus, the DC voltage on output line 44 is about −1.4 volts. A 28 kHz 0.5 volt peak-to-peak AC signal is also provided on line 44. D2 raises the switching level on line 42 for providing better operation of a switched modulator 32.

Briefly, when the handset 14 is on-hook, there is no loop current and the transmit oscillator 30 is inoperative so that line 44 is at approximately the ground reference potential. When the handset 14 is off-hook, a loop current flows to activate ring-trip circuit 28 which connects line 29 to the negative battery voltage. This energizes the transmit oscillator 30 which produces a 28 kHz signal on line 42 that is coupled through modulator 32, amplifier 34, and the 28 kHz bandpass-transmit filter 36 to the cable pair 12 for transmission to the central office to indicate that the handset 14 is off-hook. The filter 36 blocks at 76 kHz central office carrier signal on line 12 from the subscriber transmit circuit. When there is a VF output signal on line 26, it modulates the carrier signal from oscillator 30 for transmission to the central office. The oscillator 30 also produces the low level 28 kHz signal 46 on line 44 that is superimposed on the DC offset voltage. The AC signal 46 may have a peak-to-peak amplitude of 0.5 volt and be superimposed on a DC offset or bias voltage of −1.4 volts, for example.

The booster circuit 10 in FIG. 1 is essentially an energy storage-energy discharge type of switching power converter in which a resistor R2, energy storage element L1, and switching transistor Q4 are connected in series across the battery B1. The series combination of a commutating diode D1 and a smoothing or energy storage capacitor C2 is connected across Q4. C2 may be an electrolytic capacitor that is essentially connected in series with the tip-and-ring lines 16 and 18 for providing a voltage in the subscriber terminal loop that may be greater than the B1 battery voltage when the handset is off-hook, as is described more fully hereinafter. The voltage on C2 is approximately equal to the battery voltage when the handset is on-hook. Q4 is alternately conducting for passing a current which stores energy in the field of L1, and nonconducting to cause the field on L1 to collapse to charge C2 and drive the load (loop). The diode D1 prevents C2 discharging through Q4 and provides a path for charging C2 when Q4 is nonconducting. The switch Q4 is driven by a bootstrap amplifier comprising bias resistors R1, R5 and R6 and transistors Q1 and Q3 which in turn are driven by the transmit oscillator 30. The bootstrap amplifier operates to rapidly turn Q4 on and off. Q2 and R2 operate as a control circuit which disables the bootstrap amplifier and cuts off Q4 when the charging current in L1 exceeds a threshold set by R2 and the Q2 base-emitter voltage. In this manner, the maximum energy stored in the L1 field, and thus on C2, is controlled. The resistors R3 and R4 drop the −1.4 volt DC signal on line 44 (when oscillator 30 is enabled) to approximately −0.7 volt at node 47 to forward bias Q1. R3 and R4 also make it possible for conduction of Q2 to turn off Q1 and, thus, Q3 and Q4. The capacitor C1 couples the 0.5 volt peak-to-peak AC signal 46 on line 44 to the Q1 base for alternately forward and reverse biasing Q1.

When the handset is on-hook, transmit oscillator 30, is disabled to cut-off all of the transistors Q1–Q4 of circuit 10. The B1 battery voltage is then essentially connected across the tip-and-ring lines 16 and 18. When the handset goes off-hook, oscillator 30 is energized to produce the signal 46 on line 42. The resultant −0.7 volt DC offset voltage at node 47 forward biases the Q1 base. The AC component there alternately forward and reverse biases Q1. The transistor Q1 is turned on at the start of each negative half-cycle of the signal 46. During the positive half-cycles of the signal 46, the transistor Q1, and thus Q3 and Q4, are cut-off. Q1 may also be turned off by Q2 during a negative half-cycle of the signal 46 as is described more fully hereinafter.

Conduction of Q1 at time $t_1$, for example, turns on Q3 ad Q4 to pass a current through R2, L1 and Q4 that stores energy in a field on L1. Assuming that the signal 46 has been present on line 44 for some time, then C2 is charged to nominally 9 volts in the polarity shown in FIG. 1. The diode D1 prevents C2 discharging through Q4 while allowing L1 to charge C2 when Q4 is cut-off. During conduction of Q4, the battery is disconnected from the loop by cut-off of D1 and C2 discharges through the subscriber loop to provide the drive current to the handset. When the peak current in R2 is sufficient to make the voltage across it greater than the Q2 base-emitter junction voltage, then Q2 conducts to clamp node 50 to ground. This operation cuts off Q1 and rapidly drives Q4 into cut-off to interrupt the current in L1. In this manner, Q2 regulates the energy that is stored in L1 and transferred to C2 as is described more fully hereinafter. When the current in L1 decreases, the field on L1 collapses through D1 to produce a current which drives the handset and a current which charges C2. In this manner, a part of the energy stored on L1 is transferred to C2. This operation literally pulls the node 52 above ground so that a charge voltage of up to 8 or 9 volts is developed across C2, depending upon the B1 battery voltage and the loop resistance. Q1 is reverse biased by the signal 46 to hold Q3 and Q4 cut-off throughout the positive half-cycle of the input signal 46. The booster circuit 10 is designed so that the field on L1 is never fully discharged when the handset 14 is off-hook. Q1 again conducts at the start of the next negative half-cycle of the signal 46 at time $t_3$ to turn Q4 on to store additional energy in the field of L1 for subsequent charging of C2. This operation continues throughout the time interval that the handset is off-hook. During conduction of Q4, the capacitor C2 supplies power to the load, which is the subscriber handset 14. During the time interval that Q4 is cut-off, the collapsing field on L1 supplies power to the load, as well as charging C2.

It is seen from the aforementioned description that Q2 regulates the peak current in R2, and thus the energy stored in the field of L1 and transferred to C2. The circuit 28, which is conventional in the prior art, protects C2 by turning off oscillator 30 in the conventional manner when the loop current is about 8 milliamperes for a 1 kohm load, i.e., about 10 volts across C2. If circuit 28 did not perform this function, then the charge voltage produced on C2 could increase indefinitely, under certain load conditions, until the voltage rating on C2 was exceeded and C2 destroyed. Since the transmit oscillator 30 operates at 28 kHz, the on-time of Q4 may vary from zero to approximately 18 microseconds, the latter being approximately one-half the period of the signal 46. It is this conduction time of Q4 that is controlled by Q2 and which regulates the energy transferred to C2 during each cycle of the signal 46.

In a booster circuit that was built and successfully operated, C2 was a 22 microfarad electrolytic capacitor, the resistance of R2 was 17.8 ohms, and the inductance of L1 was 20 millihenries. In this circuit 10, the voltage on R2 was sufficient to cause Q2 to conduct when the charging current in L1 was 39 milliamperes.

Figure 3:
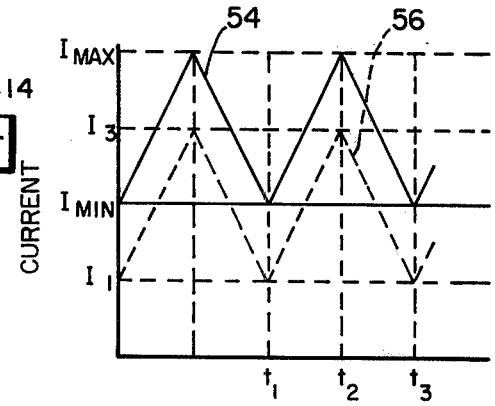
FIGS. 3 & 4 are waveforms which illustrate, and are useful in explaining, the operation of this invention.
Figure 4:
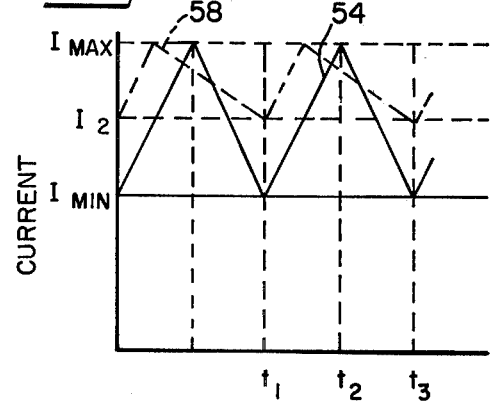

It has been observed that when a signal 46 is present on line 44, the current in L1 varies between a minimum value $I_{min}$ when Q4 is turned on, and a maximum value $I_{max}$ when Q4 is cut-off. The shape of the current waveform in R2 is illustrated in FIGS. 3 and 4 for prescribed load conditions. There are essentially three conditions on the current in R2: that it start and stop at the same levels (e.g., at $I_{min}$ at $t_1$ & $t_3$); that the slope of the L1 charging time is fixed; and that the Q4 on-time is a maximum of 50%. The slope of the L1 discharge time is a variable that depends on the load impedance. The value of $I_{max}$ is set by R2 and the Q2 base-emitter voltages; or by the load resistance, if it is low enough to keep Q2 on continuously in the off-hook condition. In the latter case, the load resistance overrides the booster control where it is so low that the input current is greater than the booster cut-off current. The value of $I_{min}$ is inversely proportional to the load impedance. The rate at which the current in L1 increases is dependent on L1 and the battery voltage. The rate at which the field in L1 decays is dependent on L1 and the voltage on C2, the latter being a function of the average power delivered to C2 and the loop resistance. The solid curves 54 in FIGS. 3 and 4 illustrate the R2 current for a nominal value of load resistance such as 400 ohms, which occurs when a Touch-Tone handset is off-hook. The broken curves 56 and 58 illustrate this current for load resistances which are greater than and less than the nominal value, respectively. The times $t_1$ and $t_3$ represent the start of a negative half-cycle of the signal 46 when Q4 conducts. It is apparent from the operation of circuit 10 that the minimum voltage boost can be zero, i.e., when the minimum current through R2 and L1 is greater than or equal to the cut-off value of Q1 (i.e., when Q2 is on all of the time).

Stated differently, the booster 10 is a driven series coil energy-storage/energy-discharge type converter circuit with maximum input current controlled by a current detector Q2 which limits the storage time. The maximum storage time is one-half of the period of the driving source 30. Equilibrium is reached when the current change through the coil L1 during energy storage is equal to the current change during energy discharge (see curves 54 in FIGS. 3 and 4). For low resistance loads (curve 58 in FIG. 4), current change is limited because $I_{min} = I_2$ is large since the battery is connected in series with coil L1 and causes the energy storage time to be reduced by the current detector Q2. For a very low load resistance, storage time becomes zero and the battery is connected directly to the load (through current detector Q2-R2, coil L1 and commutating diode D1) with no switching by Q4. For high resistance loads where the current in L1 is never sufficient to turn on Q2 (see curve 56 in FIG. 3), $I_{max}$ decreases with increasing load resistance because the voltage across the coil L1 tries to be higher during energy discharge than during energy storage. This causes $I_{min}$ to decrease to $I_1$ and consequently $I_{max}$ to decrease to $I_3$ until equilibrium is reached for 50% duty cycle. For this condition, if the load resistance is increased then the output voltage remains constant as input current decreases to the point where $I_{min} \approx 0$. For higher values of load resistance, output voltage increases to dissipate the energy stored in the inductor. For infinite load resistance, the output voltage is theoretically infinite.

Assuming 50% duty cycle and a constant voltage on C2, then the voltage across L1 during storage is $$V_{ch} = V_{B1} - V_{R2} - V_{Q4} - V_{RL1} \approx 5V. \qquad (1)$$

and the voltage across L1 during discharge to C2 is $$V_{dis} = 2V_{B1} - V_{R2} - V_{Q4} - V_{RL1} - V_{D1} \approx 10V, \qquad (2)$$

where $V_{B1} = 6$ volts, $V_{Q4}$ is the voltage drop across the Q4 emitter-collector junction, and $V_{RL1}$ is the voltage drop across the resistance of coil L1. Stated differently, $$V_{dis} = V_{B1} + V_{L1} - V_{D1} \qquad (3)$$

where $V_{L1}$ is represented by equation (1). If the input and output current of the booster circuit are $$I_{in} = (I_{max} + I_{min})/2, \text{ and} \qquad (4)$$

$$I_{out} \approx (I_{max} + I_{min})/4 \approx I_{in}, \qquad (5)$$

then the efficiency $\eta$ of the circuit is representable as $$\eta \approx (V_o I_o / V_{in} I_{in}) = (10(I_{in}/2)/6I_{in}) \approx 5/6 = 83\%. \qquad (6)$$

This efficiency does not include the power required to drive the switch Q4. Without the booster circuit 10, the loop voltage is 6 volts. With the booster circuit 10, under the conditions noted above, the loop voltage is approximately 10 volts. This indicates that the load resistance can increase by 67% for the same load current at the expense of 20% higher input current, which is approximately 30% higher input current when the switch Q4 driving power is included. Subscriber carrier station equipment without the booster circuit 10 provided approximately 15 milliamperes and 10 milliamperes into 300 ohm and 430 ohm external loop resistances, respectively. Subscriber carrier station terminal equipment with the booster circuit 10 provided approximately 14 milliampere load current into a 430 ohm load.

Conventional carrier subscriber station equipment and circuitry is similar to that illustrated in FIG. 1, where the circuit 10 is removed by cutting lines 20, 44 and 45 at nodes 61, 63 and 65, respectively, and connecting the line 20 to ground. The local battery B1 is then essentially connected in series with drop lines 16 and 18. In such subscriber station equipment where line 44 is internal to circuitry there, it is not practical to employ the booster circuit 10.

Figure 7:
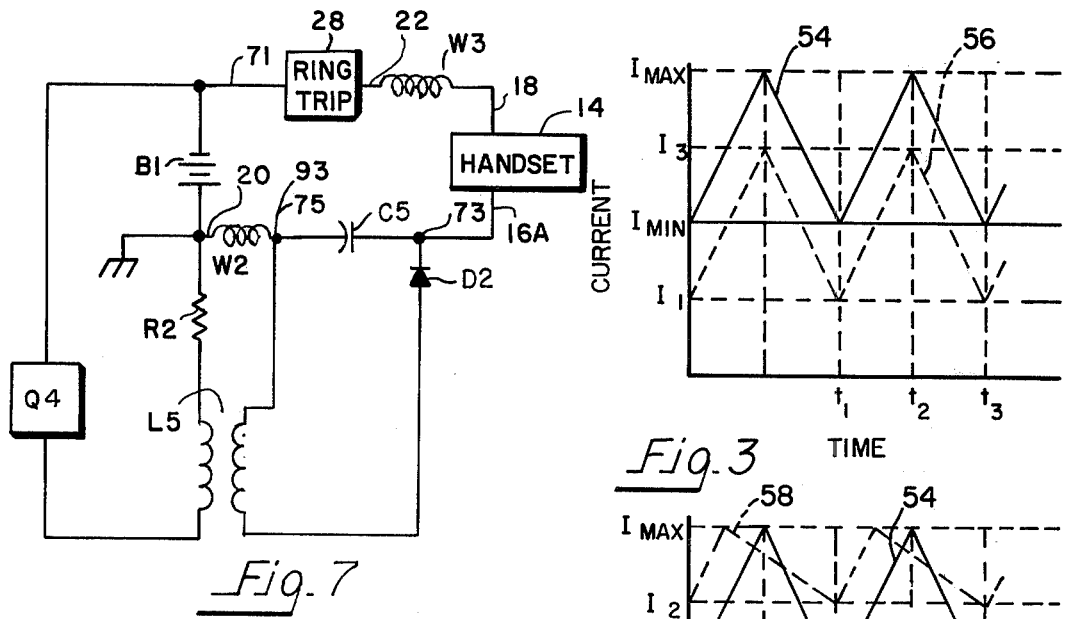
FIG. 7 is a circuit representation of the carrier subscriber station terminal local battery loop of the combined circuits in FIGS. 1 and 5.

An alternate embodiment 66 of this invention for use in such conventional subscriber station equipment is illustrated in FIG. 5. The subscriber terminal loop for this equipment is illustrated in FIG. 7. The same reference characters are used to designate the same or similar elements in FIGs. 1 and 5. The booster circuit 66 is connected to conventional carrier subscriber station equipment in FIG. 1 (without only the circuit 10 by cutting lines at nodes 61, 63 and 65 and with line 20 connected to ground) by connecting each of the input lines 67 and 69 of the circuit 66 to a different one of the wires of the cable pair 12; by cutting the line 16 in FIG. 1; and by connecting the output lines 73 and 75 of circuit 66 to lines 16A and 16B so that C5 is connected across L5 and D2 of the local loop. In this manner, the local battery B1 and storage capacitor C5 are effectively connected in series with the tip-and-ring lines 16 and 18 (see FIG. 7).

The circuit 66 is similar to the booster circuit 10 except that different circuitry 77 is employed to produce a DC bias signal on the Q1 base; different circuitry 79 is employed to couple an AC signal from transmit oscillator 30 to the Q1 base; and different circuitry 81 is employed to couple energy to the storage capacitor C5.

The circuitry 77 comprises a transistor Q6 having its emitter connected to ground, its base connected through a bias resistor R10 to the negative battery voltage, and its collector connected through bias resistors R3 and R4 to the negative battery voltage to produce the desired DC bias potential on the Q1 base at node 81. The resistances of R3, R4 and R10 are selected to cause Q6 to conduct when the transmit oscillator 30 is cut-off to produce a DC bias potential of approximately −0.3 volt at node 81 which holds Q1 and, thus, Q2, Q3 and Q4 cut-off. When Q6 is cut-off, a capacitor C6 charges through R4 toward the negative battery voltage to provide a −0.7 volt DC bias potential on the Q1 base to turn Q1 on.

In order to couple only the 28 kHz transmit oscillator signal on cable pair 12 to the Q1 and Q6 base electrodes, the input signal on lines 67 and 69 is coupled through isolation resistors R11 and R12 to a multisection bandpass filter comprising inductors L3 and L4, and capacitors C7, C8 and C9. The first filter section comprising C7, C8 and L3 is series resonant at 28 kHz for passing the carrier subscriber signal and is shunt resonant at 76 kHz for blocking the central office carrier signal on line 12. L4 is a two-winding inductor providing impedance transformation for feeding the Q6 base-emitter diode from a high impedance source, and transformation from a balanced circuit 79 to an unbalanced circuit 77. The second filter section comprising L4 and C9 is shunt resonant at 28 kHz so as to have a high impedance which provides a sufficient voltage to accommodate a wide level variation of input signals coupled to the Q1 and Q6 base electrodes. L4 may also be a tapped inductor. The transistor Q6 is cut-off by the positive half-cycle of a 28 kHz signal on line 85 which allows C6 to charge to turn on Q1 and, thus, Q4. This causes current to flow in R2 and energy to flow into the field around the windings of a transformer L5. Q2 conducts when the voltage across R2 is greater than the Q2 base-emitter voltage to discharge C6 and clamp the Q1 base to ground. This cuts off Q1 and Q4, which causes the energy stored in the field of L5 to be transferred to C5 as was described previously in relation to the circuit in FIG. 1. During the negative half-cycle of a 28 kHz signal on line 85, Q6 is forward biased and conducts to hold Q1 cut-off. This operation continues a long as an output signal of transmit oscillator 30 is present on line 85. The diode D3 may be a 5.1 volt Zener diode which limits the maximum charge voltage stored on C5 to 5.1 volts. Thus, the maximum voltage that can be presented across the tip-and-ring lines 16A and 18 by circuit 66 is 11.1 volts which is the sum of the B1 voltage and the 5.1 volt Zener potential. The capacitor C11 is employed to bypass R1 to increase high frequency gain and reduce average DC power.

Although this invention is described in relation to preferred embodiments thereof, variations and modifications will occur to those skilled in the art. By way of example, the DC potential applied to the Q1 base electrode in FIG. 1 may be less negative than 0.7 volt. It may be −0.6 volt, for example, which holds Q1 reverse biased and cut-off until the negative half-cycle of the signal 46 drives the Q1 base sufficiently negative to cause Q1 to conduct. Although C2 is connected across Q4 and D1 in FIG. 1 to protect it from lightening surges, a capacitor C2' may instead be connected across R2, L1 and D1. Further, D2 and D3 in FIG. 5 may be connected in the opposite direction for lightening protection. Also, the transformer L5 may be an inductor L1 with line 91 open circuited and with node 93 either connected to ground or to node 87, and the D2 anode connected to the Q4 collector. Additionally, the DC signal on line 44 may be produced by other than the transmit oscillator 30, i.e., a DC supply that is turned on by the AC signal 46. Further, this invention may be used in applications other than a carrier subscriber station terminal. The scope of this invention is therefore determined by the attached claims rather than the aforementioned detailed description of preferred embodiments thereof.

What is claimed is:

1. Apparatus, in a carrier subscriber station terminal including a local battery and a handset in a local loop and a transmit oscillator producing a first carrier signal having a first frequency on a cable pair for transmission to a central office when the handset is off-hook, for providing a local loop voltage in the station terminal loop that may be greater than the local battery voltage when the handset is off-hook, comprising:

first means, which is an inductive means for storing electrical energy, being electrically connected in series with the battery in the local loop;

second means, which is a switch means, electrically connected to the series combination of said first means and the battery so as to enable a battery current to pass through said first means for inducing a field on it when said second means is closed;

third means, which is a means for storing electrical energy, being electrically connected across the local loop;

fourth means coupling a signal representative of the first carrier signal to said second means during an off-hook condition of the handset for selectively closing the second means for passing a battery current through said first means for inducing a field on the latter which stores energy;

fifth means which is a control means responsive to current in said first means for selectively opening said second means when this current exceeds a prescribed value; and sixth means decoupling said first means from said third means when said second means is closed for storing energy in said first means, and coupling said first means to said third means when said second means is open for enabling energy stored in said first means to be transferred to said third means for producing a voltage thereon for driving the local loop.

2. Apparatus according to claim 1 wherein the battery and first and sixth means are in series in the loop and said fourth and fifth means cooperate for periodically opening and closing said second means, said third and sixth means being electrically connected in series across the series combination of said first means and the battery.

3. Apparatus according to claim 2 wherein said third means comprises a first capacitor and said sixth means comprises a first diode, the series combination of the first capacitor and first diode being electrically connected in parallel with the series combination of said first means and the battery, said first diode being poled for preventing discharge of said first capacitor through said first and second means and for enabling decay of the field on said first means into said first capacitor for charging the latter for second means closed and open.

4. Apparatus according to claim 3 wherein said fifth means comprises a first resistor electrically connected in series with said first means and a first transistor having a base-emitter junction electrically connected across said first resistor for sensing the current level through said first means, the first transistor conducting when this current is greater than a prescribed level for causing said second means to open for causing energy stored in the field on said first means to be transferred to said first capacitor.

5. Apparatus according to claim 1 wherein the battery and first and sixth means are electrically connected in series in the loop and said fourth and fifth means cooperate for periodically opening and closing said second means, said third and sixth means being electrically connected in series across said first means.

6. Apparatus according to claim 5 wherein said third means comprises a first capacitor and sixth means comprises a first diode, the series combination of the first capacitor and first diode being electrically connected in parallel with said first means, said first diode being poled for preventing discharge of said first capacitor through said first and second means and for enabling decay of the field on said first means into said first capacitor for charging the latter, for second means closed and open.

7. Apparatus according to claim 6 wherein said fifth means comprises a first resistor electrically connected in series with said first means and a first transistor having a base-emitter junction electrically connected across said first resistor for sensing the current level through said first means, the first transistor conducting when this current is greater than a prescribed level for causing said second means to open for causing energy stored in the field on said first means to be transferred to said first capacitor.

8. Apparatus according to claim 1 wherein the battery and first and sixth means are electrically connected in series and said fourth and fifth means cooperate for periodically opening and closing said second means, the series combination of said third means and the battery being electrically connected in series for providing a loop voltage that may be greater than the battery voltage to the handset when the handset is off-hook.

9. Apparatus according to claim 8 wherein said third means comprises a first capacitor and said sixth means comprises a first diode, the series combination of the first capacitor and first diode being electrically connected to seventh means electrically coupling energy stored in the field on said first means to said first diode which is poled for preventing discharge of said first capacitor through said seventh means and for enabling decay of the field on said first means into said first capacitor for charging the latter for second means closed and open.

10. Apparatus according to claim 9 wherein said fifth means comprises a first resistor electrically connected in series with said first means and a first transistor having its base-emitter junction electrically connected across said first resistor, said first transistor sensing the voltage produced across said first resistor and conducting when the current through the latter is greater than a prescribed value for causing said second means to open for causing the field on said first means to collapse to charge said first capacitor.

11. Apparatus according to claim 10 wherein said third means further comprises a zener diode electrically connected in parallel with said first capacitor for limiting the maximum charge voltage stored on said first capacitor and the carrier station terminal receives a second carrier signal having a second frequency from the central office on the cable pair, said fourth means comprising filter means having a passband at the first frequency and a stop band at the second frequency.

12. In a carrier subscriber station terminal including a local battery, a handset connected in a local loop, and a transmit oscillator producing a first alternating carrier signal having a first frequency on a cable pair when the handset is off-hook, apparatus for producing in the station terminal loop a loop voltage which may be greater than the local battery voltage when the handset is off-hook, comprising:

first means, which is an inductive means for storing electrical energy, being electrically connected in series with the battery in the local loop;

second means, which is a switch means, electrically connected across the series combination of said first means and the local battery;

third means, which is a means for storing electrical energy, electrically coupled to said first means and the loop;

fourth means for coupling a signal representative of the first signal and a DC signal, during an off-hook condition of the handset, to said second means which is biased by the DC signal so as to be operable to open and close in response to alternate half cycles of the first signal, closing of said second means causing it to pass a local battery current through said first means to induce a field on the latter which stores energy; and fifth means, which is a control means, responsive to the current passed by said first means for selectively opening said second means for enabling energy stored in the field on said first means to be transferred to said third means for providing a voltage on it for driving the local loop.

13. Apparatus according to claim 12 wherein said fourth and fifth means cooperate for periodically opening and closing said second means.

14. Apparatus according to claim 13 wherein said third means comprises the series combination of a first capacitor and a first diode electrically connected in parallel with the series combination of the battery and first means, said first diode being electrically connected in series in the loop and poled for preventing discharge of said first capacitor through said first and second means when said second means is closed and for enabling decay of the field on said first means into said first capacitor for charging the latter when said second means is open, said first capacitor being electrically connected to the loop for providing a loop voltage which may be greater than the local battery voltage.

15. Apparatus according to claim 13 wherein said third means comprises the series combination of a first capacitor and a first diode electrically connected in parallel with said first means, said first diode being electrically connected in series in the loop and poled for preventing discharge of said first capacitor through said first and second means when said second means is closed and for enabling decay of the field on said first means into said first capacitor for charging the latter when said second means is open, said first capacitor being electrically connected to the loop for providing a loop voltage for driving the loop which may be greater than the local battery voltage.

16. Apparatus according to claim 13 wherein said third means comprises a first capacitor electrically connected across seventh means and a first diode that are electrically connected in series in the loop, said seventh means coupling energy from the field on said first means, said first diode being poled for preventing discharge of said first capacitor through said seventh means and for enabling the field on said first means to decay into said seventh means and said capacitor for charging the latter when said second means is open, said first capacitor being electrically connected in series with the battery and to the loop for providing a voltage for driving the local loop which may be greater than the local battery voltage.

17. Apparatus according to claim 14 wherein said fifth means comprises a first resistor electrically connected in series with said first means and a first transistor having a base-emitter juntion electrically connected across said first resistor for sensing the current level to said first means, said first transistor conducting when current through said first resistor exceeds a prescribed level for causing said second means to open for causing energy stored in the field on said first means to be transferred to said first capacitor.

18. Apparatus according to claim 17 wherein said second means comprises a second transistor having its primary conduction path electrically connected across said battery and having a base electrode for receiving the first alternating signal and the DC voltage, and a third transistor having its primary conduction path electrically connected across the series combination of said first diode and first capacitor and having a base electrode receiving a drive signal from said second transistor, said second transistor being responsive to the first and DC signals for causing said third transistor to conduct to induce a field on said first means and being responsive to conduction of said first transistor for biasing said third transistor into cut-off for causing the field on said first means to collapse to transfer thereto said first capacitor.

19. In a carrier subscriber station terminal including a local battery and a handset connected in series in a local loop there and a transmit oscillator producing a first carrier frequency signal on a cable pair when the handset is off-hook, the carrier station terminal receiving a second carrier frequency signal from a central office on the cable pair, apparatus for producing a local loop voltage which may be greater than the local battery voltage when the handset is off-hook, comprising:

first means, which is an inductive means for storing electrical energy, being electrically connected in series with the battery in the loop;

second means, which is a switch means, electrically connected across the series combination of said first means and the battery;

third means, which is a means for storing electrical energy, being electrically connected across the loop and electrically coupled to said first means;

fourth means for coupling the first signal to said second means, when the handset is off-hook, for selectively closing the latter for passing battery current through said first means to induce a field on the latter which stores energy; and fifth means, which is a control means, responsive to current through said first means for selectively opening said second means for enabling energy stored in the field on said first means to be transferred to said third means.

20. Apparatus according to claim 19 wherein said second means is responsive to the first signal for closing on alternate half-cycles thereof to pass a current through said first means, said fifth means being operative for periodically opening said second means.

21. Apparatus according to claim 20 wherein said third means comprises the series combination of a first capacitor and a first diode electrically connected to sixth means that electrically couples energy stored in the field on said first means therefrom with at least said diode in series in the loop; said first diode being poled for preventing discharge of said first capacitor through said sixth means when said second means is closed and for enabling decay of the field in said first means into said sixth means and thus said capacitor for charging the latter when said second means is open, said capacitor being in series with the battery in a local loop path.

22. Apparatus according to claim 21 wherein said third means further comprises a Zener diode electrically connected in parallel with said first capacitor for limiting the maximum voltage stored on the latter.

23. Apparatus according to claim 21 wherein said fifth means comprises a first resistor electrically connected in series with said first means and a first transistor having a base-emitter junction electrically connected across said first resistor for sensing the current level through said first means, said first transistor conducting when current through said first resistor exceeds a prescribed level for causing said second means to open for causing energy stored in the field on said first means to be transferred to said first capacitor.

24. Apparatus according to claim 23 wherein said second means comprises a second transistor having its primary conduction path electrically connected across the battery and having a base electrode for receiving the first signal, and a third transistor having its primary conduction path electrically connected in series with said first means and having a base electrode receiving a drive signal from said second transistor, said second transistor being responsive to the first signal for causing said third transistor to conduct to induce a field on said first means and being responsive to conduction of said first transistor for biasing said third transistor into cut-off for causing the field on said first means to collapse to transfer energy thereon through said sixth means to said first capacitor.

25. Apparatus according to claim 24 wherein said fourth means comprises filter means having a passband at the first frequency and a stopband at the second frequency.

26. Apparatus according to claim 25 wherein said second means further comprises a fourth transistor which is operative for maintaining said first, second and third transistors cut-off when the handset is on-hook.

* * * * *